(No Model.) 3 Sheets—Sheet 1.
F. FRECK.
PLOW.
No. 441,478. Patented Nov. 25, 1890.
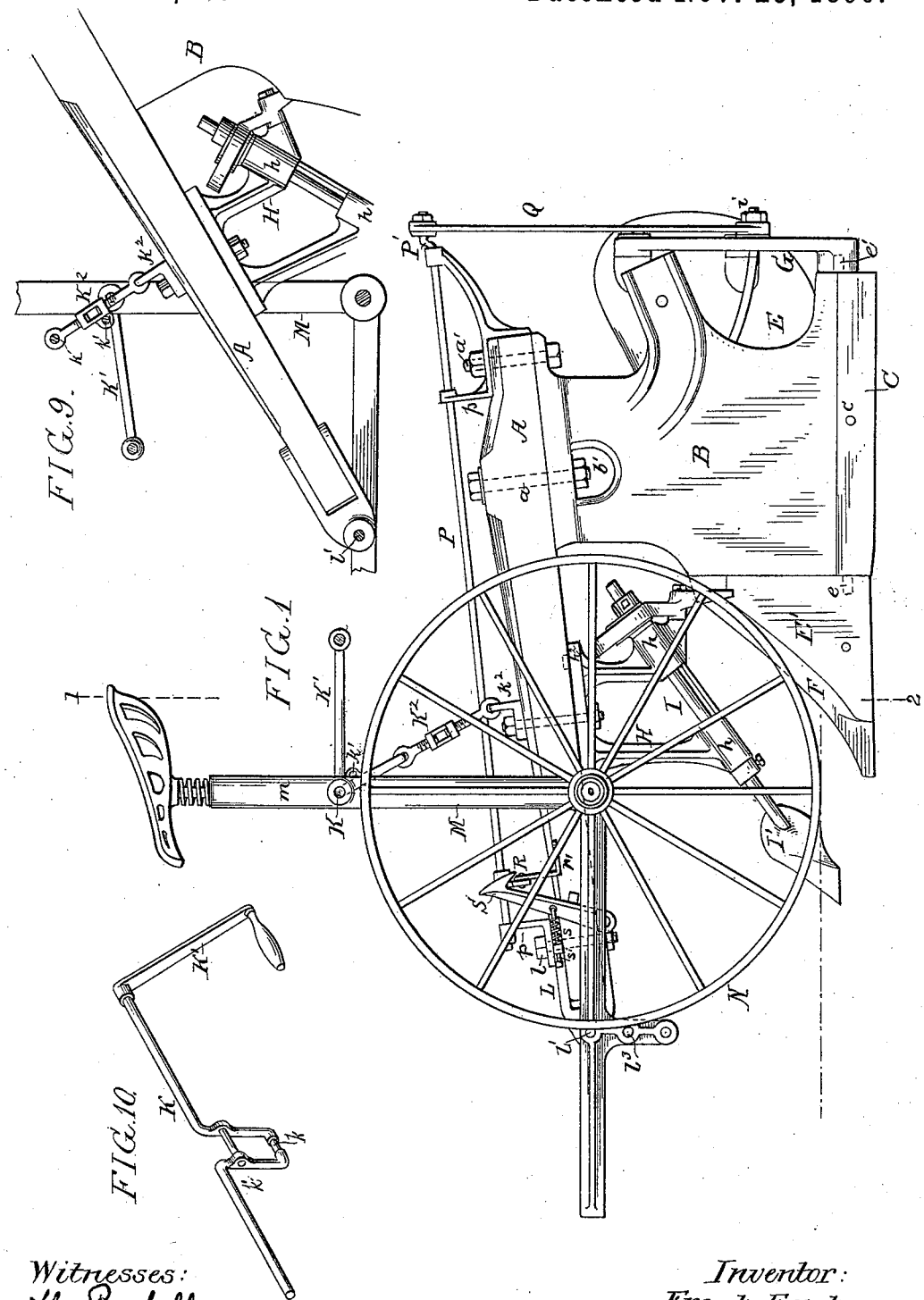
Witnesses:
Alex Barkoff
A. V. Groupe
Inventor:
Frank Freck
by his Attorneys
Henson & Howson

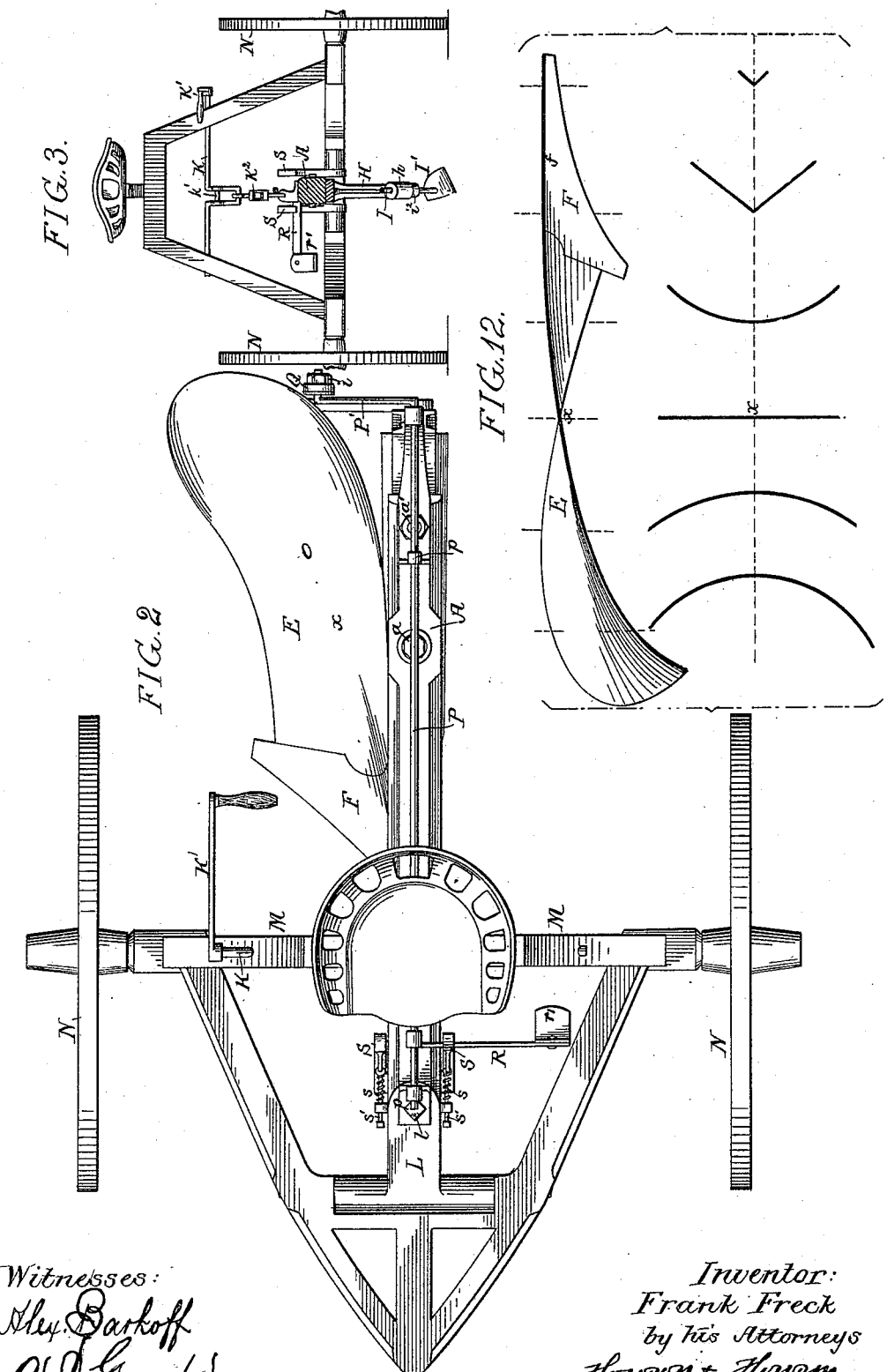

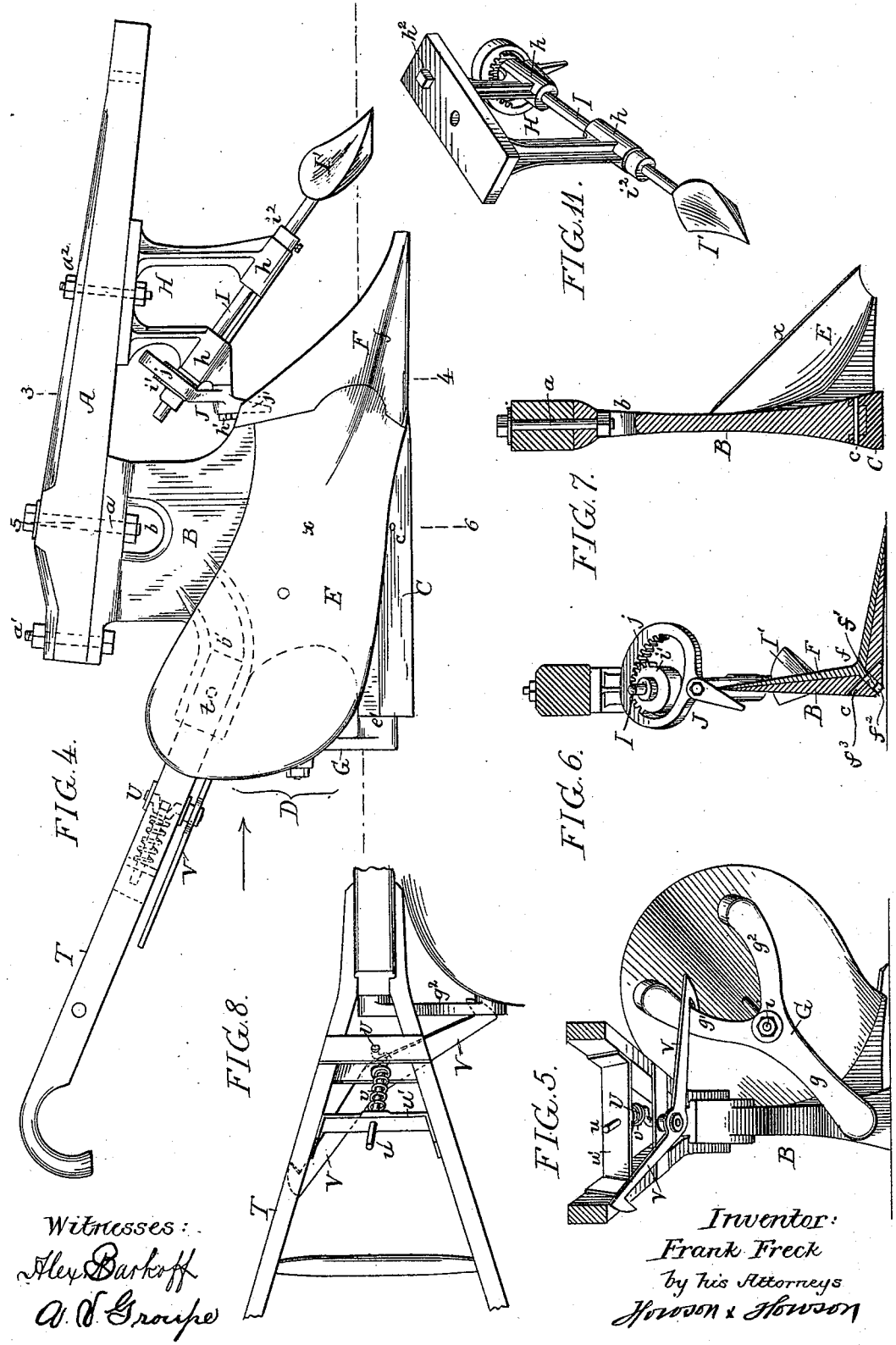

UNITED STATES PATENT OFFICE.

FRANK FRECK, OF COLLINSVILLE, PENNSYLVANIA.

PLOW.

SPECIFICATION forming part of Letters Patent No. 441,478, dated November 25, 1890.

Application filed November 22, 1889. Serial No. 331,188. (No model.)

*To all whom it may concern:*

Be it known that I, FRANK FRECK, a citizen of the United States, and a resident of Collinsville, Lycoming county, Pennsylvania, have invented certain Improvements in Plows, of which the following is a specification.

The object of my invention is to construct a reversible mold-board plow which is also capable of being either used as a sulky-plow or a hand-plow, and this object I attain in the following manner, reference being had to the accompanying drawings, in which—

Figure 1 is a side view of my improved plow arranged as a sulky-plow. Fig. 2 is a plan view of Fig. 1. Fig. 3 is a transverse section on the line 1 2, Fig. 1, drawn to a reduced scale. Fig. 4 is a side view of the plow arranged as a hand-plow. Fig. 5 is a rear view looking in the direction of the arrow 1, Fig. 2, with the handles in section. Fig. 6 is a section on the line 3 4, Fig. 2. Fig. 7 is a section on the line 5 6, Fig. 2. Fig. 8 is a view of the handle portion of the plow. Fig. 9 is a sectional view showing the lifting arrangement. Fig. 10 is a perspective view of the lifting crank-shaft. Fig. 11 is a perspective view of the colter portion of the plow. Fig. 12 is a diagram view showing the formation of the mold-board.

Referring to Figs. 1 and 2, A is the plow-beam, of the usual construction. B is the post, secured to the beam by the bolts $a\ a'$, the bolt $a$ passing through the beam into a recess $b$ in the post, and a nut is applied to the end of the bolt, as shown. On the rear end of the post are the grooves $b'$ for the reception of the handle, described hereinafter. Secured to the lower edge of the post is a shoe C. A single pin $c$, made, preferably, of hard wood, secures the shoe to the post. The pin, being made of wood, will wear away in the same proportion as the shoe, so as to insure a smooth landside.

D is a frame, composed of the mold-board E, its carrier E', the share F, and the yoke G. This frame is preferably constructed in the manner shown in the drawings, and is pivoted to the lower portion of the post B by pivot-pins $e\ e'$, the pin $e$ being on the carrier E' and the pin $e'$ on one arm of the yoke G, so that the frame D can be swung around the post so as to cut right and left hand furrows.

I will here state that the object of constructing a plow having the reversible portion D is that in plowing a field the operator can commence at one corner of the field, plow a furrow along one side of the field, and then turn the frame D to the opposite side of the post and make a furrow parallel with the previous furrow, the frame being shifted at the end of each furrow instead of plowing around the field, as is usually done with a single plow, until the center portion of the field is reached.

The mold-board is secured to the carrier E' in any suitable manner; but I prefer to secure the share to the carrier in the following manner: The share, being a double share, is of the peculiar shape shown in Fig. 6 of the drawings, having comparatively sharp corners $f$. On the rear corner of the share is a lug $f'$, which rests in a recess $f^2$ in the carrier E'. A pin $f^3$ passes transversely through the carrier and through the lug on the share, as shown in Fig. 4, thus securely fastening the share to the carrier. This pin can readily be removed by simply driving it from its seat, as the opening for the pin preferably extends through from side to side of the carrier.

The yoke G has arms $g\ g'\ g^2$. The arm $g$ is adapted to the pivot-pin $e'$, and the arms $g'$ and $g^2$ are secured to lugs on the rear of the mold-board by bolts, as shown in Fig. 5. A tie-rod secured to the center of the mold-board passes through the yoke and is secured thereto and forms a pivot-pin $i$, to which is pivoted the connecting-rod of the shifting mechanism used in connection with the sulky arrangement.

Secured to the under side of the beam A by a single bolt $a^2$ is a frame H of the colter, having at its lower end bearings $h\ h$ for the inclined shaft I, provided at its lower end with the colter proper I'. On the rear end of the shaft I is a gear-wheel $i'$, meshing with segmental gear $j$ on one arm of the lever J, pivoted to the frame H at $h'$. The other arm $j'$ of this lever extends down in the path of the share, and is operated thereby, so that when the frame carrying the share is moved to the right-hand side of the post it will strike the arm $j'$, and through the medium of the gearing will shift the colter to make a right-hand slice of the furrow. When the frame carrying the share is shifted to the left-hand side of the post, it also shifts the colter by striking the arm *j'* so as to cut a left-hand furrow slice, so that the adjustment of the colter in respect to the share and mold-board is automatic. The colter-shaft I is longitudinally adjustable in the bearings *h*, the gear-wheel being secured to the shaft by means of a set-screw, which prevents motion in one direction, and a collar $i^2$, having a set-screw, prevents movement in the opposite direction.

As above remarked, the frame H is secured to the beam by a single bolt and has, preferably, a lug $h^2$, which projects in a recess in the under side of the beam, preventing the frame from turning.

I will now describe the plow in connection with the sulky arrangement.

Referring to Figs. 1 and 2, N N are the wheels mounted on the frame M of the sulky portion, having a yoke-extension *m*, on which is mounted the spring-seat *l*, and the crank-shaft K, having a suitable handle K' in easy reach of the operator. The crank portion *k* of the shaft is connected by a connecting-rod $K^2$ to a ring $k^2$, secured to the beam of the plow. This rod can be lengthened or shortened by means of the swivel-nut thereon. When the shaft is turned to the position shown in Fig. 8, the connecting-rod strikes a cross-bar *k'* on the crank-shaft, the crank being slightly over dead-center. It will be locked in the position shown in Fig. 9 and the plow suspended without other retaining devices. By simply moving the crank over the dead-center the plow can be dropped. The beam A is attached to a clevis-block L by a bolt *l*. This block is swung to a transverse shaft or pin *l'*, which is passed through one of a series of orifices $l^3$ in the sulky-frame M. By having the series of orifices $l^3$ the block L can be raised or lowered to alter the draft of the plow. Running parallel with the beam and mounted thereon is a shaft P, the bearings *p p* of which are secured to the beam by bolts *a'* and *l*. This shaft has a crank P' at its rear end, to which is attached the connecting-rod Q, pivoted to the pin *i* at its lower end. On the opposite end of the shaft P is a lever R, by which the plow-frame D is reversed. Spring-catches S on each side of the block L pass over and hold the lever R in either of its positions, thus firmly holding the plow portion D in either of its two positions. By pressing upon a step *r'* on the lever R the lever can be depressed clear of its catches, which can be pushed away to allow the lever to swing over. Compression-springs *s s* tend to force the catches S forward, a stop on a central rod *s'* limiting the forward movement.

To remove the plow proper from the sulky portion, the bolt *l* is withdrawn, the connecting-rod Q removed from the pivot-pin *i*, and the bearings *p p* and ring $k^2$ removed from the beam. The plow portion is then ready for attachment of the handles T T, which are secured to the rear of the post by a bolt *t*.

Pivoted to the handles is a crank-shaft U, having two hooked arms V V, adapted to hook onto one or other of the arms *g'* of the yoke G of the plow portion D. To the cranked portion of the shaft U is pivoted a bar *u*, which passes through a bearing in a plate *u'*, and between a collar on this bar and the plate is a compression-spring *v*, so that when the levers V are shifted the springs hold the arms in a shifted position, as clearly understood on reference to Figs. 4 and 8. By simply moving the arms out of engagement with the portion D this portion can be turned so as to reverse the plow.

It will be noticed on referring to Figs. 2, 4, and 12 that the mold-board is shaped as follows: The share has a sharp corner and the sides are nearly at right angles to each other; but this sharp corner gradually disappears until the point *x* is reached in the mold-board, where it is practically straight, and as the mold-board recedes a reverse curve is put in the board, and the rear end of the mold-board is concaved, as clearly shown in the series of diagrams, Fig. 12, so that the mold-board will throw the furrow-slice over properly whether the plow is in either of its two positions.

I claim as my invention—

1. The combination, in a plow, of the reversible plow portion and plowshare having cutting-edges at right angles to each other, forming a deep-cut groove *f*, with a mold-board the face of which gradually shapes from the deep concave of the groove *f* to a convex shape at its rear end, so that the furrow-slice will be turned accurately when the plow is in either of its two positions, substantially as specified.

2. The combination, in a plow, of the pivoted plow portion with a colter having at its rear end a gear-wheel, and a lever having a rack meshing with said gear-wheel and having an arm in the path of the pivoted portion, whereby the colter is reversed on reversing the plow portion, substantially as described.

3. The combination, in a plow, of the frame H, secured to the under side of the beam, and a shaft I, adapted to bearings in said frame and having at one end a colter and at the opposite end a gear-wheel meshing with the reversing mechanism, said shaft being longitudinally adjustable in its bearings, substantially as and for the purpose described.

4. The combination, in a plow, of the pivoted plow portion, longitudinal shaft cranked at its rear end, connecting-rod connected to the pivoted plow portion, and a crank with a lever and catches adapted to secure the lever in either of its two positions, substantially as described.

5. The combination, in a plow, of the pivoted plow portion, the longitudinal shaft mounted in bearings, having at one end a crank, a connecting-rod secured to the crank and to the pivoted plow-section, a lever at the opposite end of the shaft, and spring-catches for holding the lever in its two positions, with a step on the lever, whereby the lever can be pressed down and released from the catches, substantially as described.

6. The combination, in a plow, of the sulky-frame, plow-beam pivoted to said frame, with transverse crank-shaft mounted on said frame, a handle thereon, with a connecting-rod attached to the crank and to an eye on the plow-beam, with a stop-bar on the crank-shaft to lock and hold the beam in its raised position, substantially as described.

7. The combination, in a plow, of the sulky-frame M, having a vertical loop, a forward extension at an angle to said loop, a clevis-block pivoted to said forward extension, the plow-beam pivoted to said clevis-block, a transverse shaft on the looped portion of the frame, a crank thereon, connecting-rod secured to the crank and to the beam, and a handle for operating the shaft, the whole acting substantially as described.

8. The combination, in a plow, of the angular carrier E', with an angular share F, and a perforated lug $f'$ on the rear corner of the share, adapted to a recess $f^2$ in the carrier, with a pin $f^3$, passing transversely through the carrier and the lug of the share, whereby the share is securely fastened to the carrier, substantially as described.

In testimony whereof I have signed my name to this specification in the presence of two subscribing witnesses.

FRANK FRECK.

Witnesses:
   JOS. H. KLEIN,
   HENRY HOWSON.